US009800793B2

United States Patent
Chang et al.

(10) Patent No.: US 9,800,793 B2
(45) Date of Patent: Oct. 24, 2017

(54) METHOD FOR GENERATING TARGET GAIN VALUE OF WIDE DYNAMIC RANGE OPERATION

(71) Applicant: Realtek Semiconductor Corp., Hsinchu (TW)

(72) Inventors: Wei-Te Chang, Taoyuan (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/296,324

(22) Filed: Oct. 18, 2016

(65) Prior Publication Data

US 2017/0208233 A1    Jul. 20, 2017

(30) Foreign Application Priority Data

Jan. 14, 2016 (TW) .............................. 105101144 A (51) Int. Cl.
*H04N 5/235* (2006.01)
*G06T 7/40* (2017.01)
(Continued)

(52) U.S. Cl.
CPC ......... *H04N 5/2352* (2013.01); *G06K 9/4661* (2013.01); *G06K 9/6215* (2013.01); *G06T 7/408* (2013.01)

(58) Field of Classification Search
CPC ...... H04N 5/20; H04N 5/2352; H04N 5/2353; H04N 5/2355; H04N 9/045; H04N 9/646;
(Continued)

(56) References Cited

U.S. PATENT DOCUMENTS

| 5,712,682 | A  | * | 1/1998 | Hannah ..................... | H04N 5/20 348/222.1 |
| 7,098,945 | B1 | * | 8/2006 | Sasai ....................... | H04N 9/045 348/223.1 |
| 8,154,628 | B2 | * | 4/2012 | Ishida ..................... | G06T 5/008 348/241 |
| 2010/0020205 | A1 | * | 1/2010 | Ishida ..................... | G06T 5/008 348/241 |
| 2010/0310189 | A1 | * | 12/2010 | Wakazono ............... | G06T 5/008 382/258 |
| 2011/0249890 | A1 | * | 10/2011 | Kim ........................ | G06T 5/009 382/162 |
| 2014/0240533 | A1 | * | 8/2014 | Hirooka .................. | H04N 9/643 348/223.1 |

(Continued)

FOREIGN PATENT DOCUMENTS

TW        201410017 A      3/2014

OTHER PUBLICATIONS

Wong et al., "A Method for the Evaluation of Wide Dynamic Range Cameras," Proceedings of SPIE, vol. 8299, Digital Photography VIII, Jan. 24, 2012, 7 pages.

*Primary Examiner* — Pritham Prabhakher
(74) *Attorney, Agent, or Firm* — Birch, Stewart, Kolasch & Birch, LLP (57) ABSTRACT

A method for generating a target gain value of a wide dynamic range (WDR) operation is disclosed including: acquiring an average bright portion luminance corresponding to an average pixel luminance of a bright portion of a video image; acquiring an average dark portion luminance corresponding to an average pixel luminance of a dark portion of the video image; generating an initial gain value of the WDR operation according to a difference between the average bright portion luminance and the average dark portion luminance; and adjusting the initial gain value according to at least one of a color temperature and an exposure duration configuration value of the video image to generate the target gain value.

10 Claims, 6 Drawing Sheets

(51) Int. Cl.
*G06K 9/46* (2006.01)
*G06K 9/62* (2006.01)

(58) Field of Classification Search
CPC .......... H04N 9/74; H04N 9/68; G06K 9/4661;
G06K 9/6215; G06T 7/408; G06T
7/0081; G06T 7/136; G06T 7/11; G06T
7/194; G06T 5/008; G06T 5/009; G06T
5/20; G06T 5/40; G06T 2207/20144;
G06T 2207/10004; G06T 2207/20208;
G06T 2207/10144; G06T 2207/10024;
G06T 2207/20148; G06T 2207/20024
USPC ........................................................ 348/234
See application file for complete search history.

(56) References Cited

U.S. PATENT DOCUMENTS

| | | | | |
|---|---|---|---|---|
| 2014/0307117 A1* | 10/2014 | Feng | .................... | H04N 5/2351 |
| | | | | 348/218.1 |
| 2014/0329128 A1* | 11/2014 | Ohashi | .................... | B32B 27/08 |
| | | | | 429/144 |
| 2015/0009361 A1* | 1/2015 | Liu | ..................... | H04N 5/2356 |
| | | | | 348/229.1 |
| 2015/0244917 A1* | 8/2015 | Huang | ................ | H04N 5/2355 |
| | | | | 348/222.1 |

* cited by examiner

METHOD FOR GENERATING TARGET GAIN VALUE OF WIDE DYNAMIC RANGE OPERATION

CROSS-REFERENCE TO RELATED APPLICATIONS

This application claims the benefit of priority to Patent Application No. 105101144, filed in Taiwan on Jan. 14, 2016; the entirety of which is incorporated herein by reference for all purposes.

BACKGROUND

The disclosure generally relates to an image processing technology and, more particularly, to a method for generating a target gain value of a wide dynamic range (WDR) operation.

The high dynamic range (HDR) operation is greatly beneficial to improve clarity of the high contrast images, and thus widely used in many image processing systems, such as digital cameras, smart phones, tablet computers, surveillance systems, and the like.

The conventional HDR operation configures multiple images of successive points of time to have different exposure durations, and then combines these images to form single image having appropriate luminance in both the dark portion and bright portion.

However, the conventional HDR operation requires the use of more complex image sensors, and thus the overall circuitry complexity of the image processing system would be inevitably increased.

SUMMARY

An example embodiment of a method for generating a target gain value of a wide dynamic range (WDR) operation is disclosed, comprising: acquiring an average bright portion luminance corresponding to an average pixel luminance of a bright portion of a video image; acquiring an average dark portion luminance corresponding to an average pixel luminance of a dark portion of the video image; generating an initial gain value of the WDR operation according to a difference between the average bright portion luminance and the average dark portion luminance; and adjusting the initial gain value according to at least one of a color temperature and an exposure duration configuration value of the video image to generate the target gain value.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
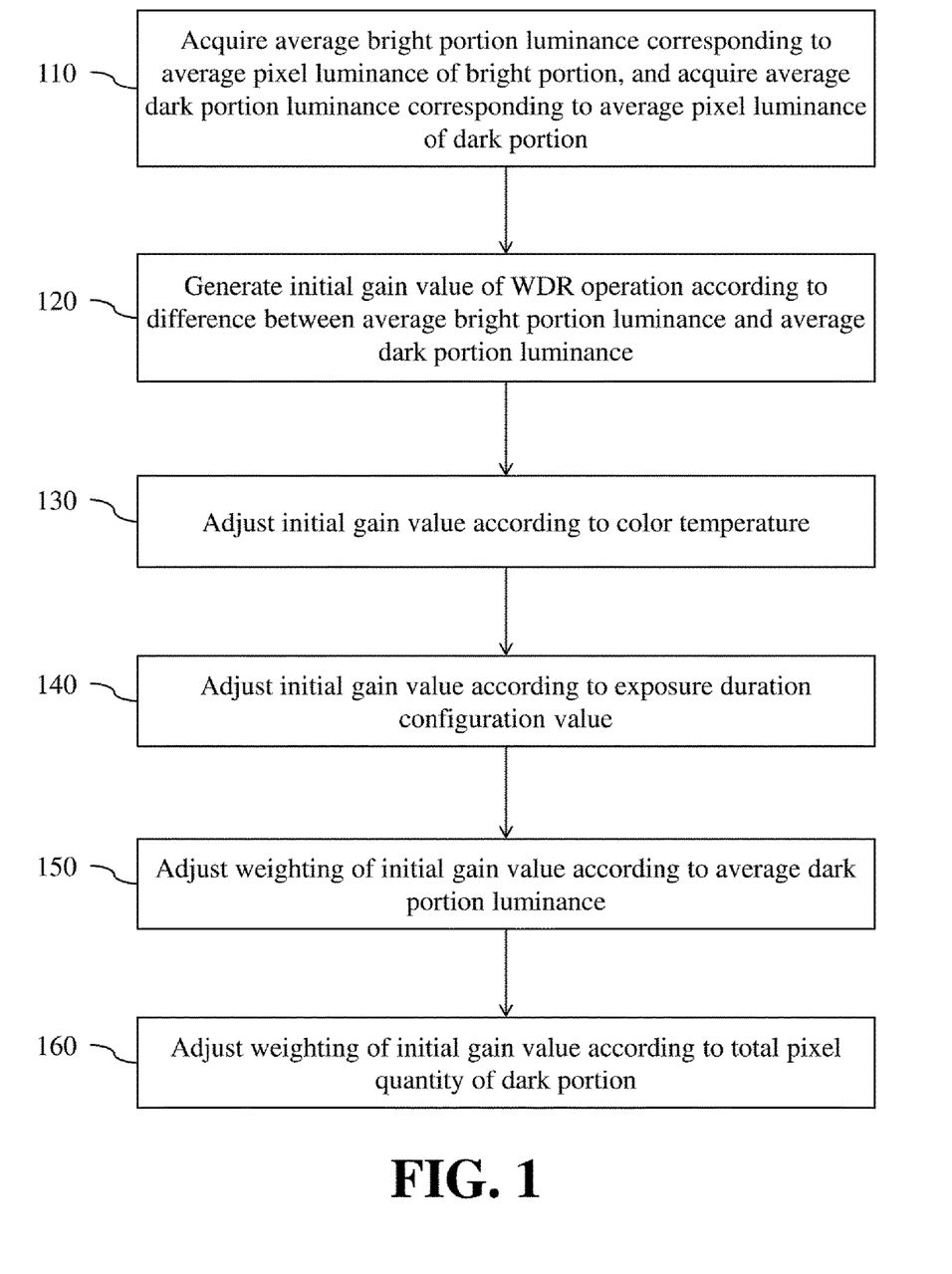
FIG. 1 shows a simplified flowchart of a method for generating a target gain value of the WDR operation according to a first embodiment of the present disclosure.

FIG. 1 shows a simplified flowchart of a method for generating a target gain value of the WDR operation according to a first embodiment of the present disclosure. In practical applications, an image processing system, such as a digital camera, a smart phone, a tablet computer, or a surveillance system, is enabled to generate a target gain value for use in conducting the WDR operation on an arbitrary video image by executing software implementing the method of FIG. 1. Then, the image processing system may utilize the resulting target gain value to conduct the WDR operation on the video image, so as to increase the visibility and clarity of the resulting video image.

Before conducting the WDR operation on the arbitrary video image, the image processing system may perform the operation 110 to acquire an average bright portion luminance corresponding to the average pixel luminance of the bright portion of the video image, and to acquire an average dark portion luminance corresponding to the average pixel luminance of the dark portion of the video image.

In practice, the image processing system may directly acquire the aforementioned average bright portion luminance and average dark portion luminance from other existing circuits, or may independently perform a brightness computation for the video image.

In the operation 120, the image processing system may generate an initial gain value of the WDR operation according to the difference between the average bright portion luminance and the average dark portion luminance. In general, a larger difference between the average bright portion luminance and the average dark portion luminance translates to a higher possibility that the arbitrary video image is corresponding to a high contrast scene. On the contrary, a smaller difference between the average bright portion luminance and the average dark portion luminance translates to a lower possibility that the arbitrary video image is corresponding to a high contrast scene. Accordingly, the image processing system may configure the initial gain value to be directly proportional to the difference between the average bright portion luminance and the average dark portion luminance.

Since the difference between the average bright portion luminance and the average dark portion luminance cannot accurately reflect the scene of the arbitrary video image, the image processing system further proceeds to the operations 130 and 140.

In the operation 130, the image processing system may adjust the initial gain value according to the color temperature of the video image. A higher color temperature translates to a higher possibility that the video image is corresponding to an outdoor scene. On the contrary, a lower color temperature translates to a higher possibility that the video image is corresponding to an indoor scene. In general, when the video image is corresponding to the outdoor scene, there is a higher possibility that the video image is generated under a strong back light situation. A video image of the indoor scene may have the possibility to be taken under a back light situation, but the back light situation in the indoor scene is typically gentler than that in the outdoor scene. Accordingly, the image processing system may configure the initial gain value to be directly proportional to the color temperature.

In the operation 140, the image processing system may adjust the initial gain value according to an exposure duration configuration value of the video image. The term "exposure duration configuration value" as used throughout the description and claims refers to the exposure duration setting value of the image sensor when the hardware WDR function is disabled. In general, a smaller exposure duration configuration value translates to a higher possibility that the video image is corresponding to an outdoor scene. On the contrary, a larger exposure duration configuration value translates to a higher possibility that the video image is corresponding to an indoor scene. Accordingly, the image processing system may configure the initial gain value to be inversely proportional to the exposure duration configuration value.

In order to increase the accuracy of the subsequent WDR operation, the image processing system may take the average dark portion luminance and the total pixel quantity of the dark portion into consideration to further adjust the gain value of the WDR operation.

For example, after the aforementioned operations 130 and 140, the image processing system may perform the operation 150 to further adjust a weighting of the initial gain value according to the average dark portion luminance.

Figure 2:
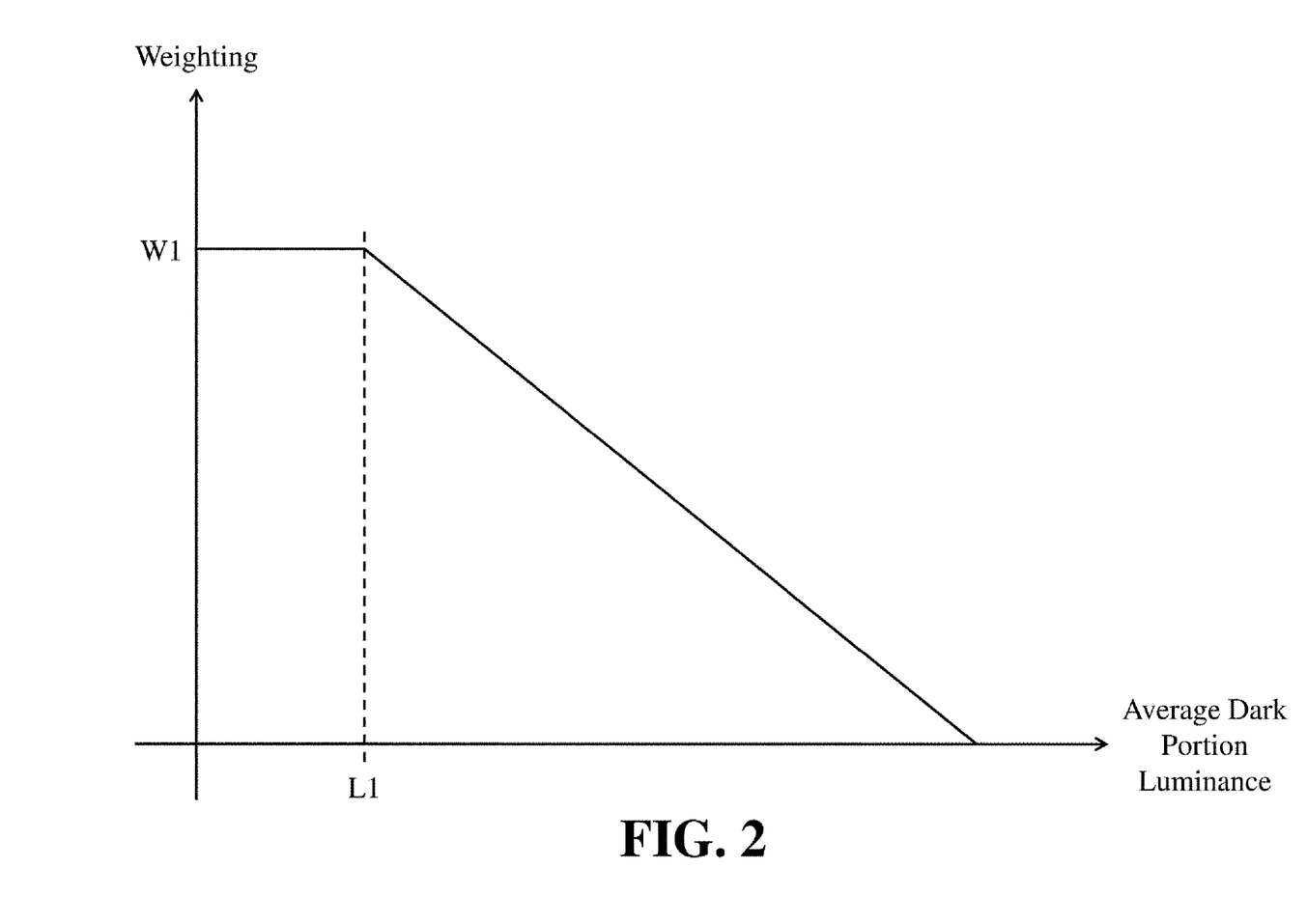
FIG. 2 shows a simplified schematic diagram of adjust the weighting of an initial gain value of the WDR operation according to the average dark portion luminance according to one embodiment of the present disclosure.

Please refer to FIG. 2, which shows a simplified schematic diagram of adjust the weighting of the initial gain value of the WDR operation according to the average dark portion luminance according to one embodiment of the present disclosure.

As shown in FIG. 2, if the average dark portion luminance of the video image is lower than a threshold luminance L1, then the image processing system may configure the weighting of the initial gain value to be fixed at a first predetermined weighting W1. If the average dark portion luminance is greater than the threshold luminance L1, then the image processing system may configure the weighting of the initial gain value to be inversely proportional to the average dark portion luminance, such as a linearly inversely proportional relationship shown in FIG. 2.

In addition, after adjusting the weighting of the initial gain value based on the average dark portion luminance, the image processing system may perform the operation 160 to further adjust the weighting of the initial gain value according to the total pixel quantity of the dark portion of the video image.

Figure 3:
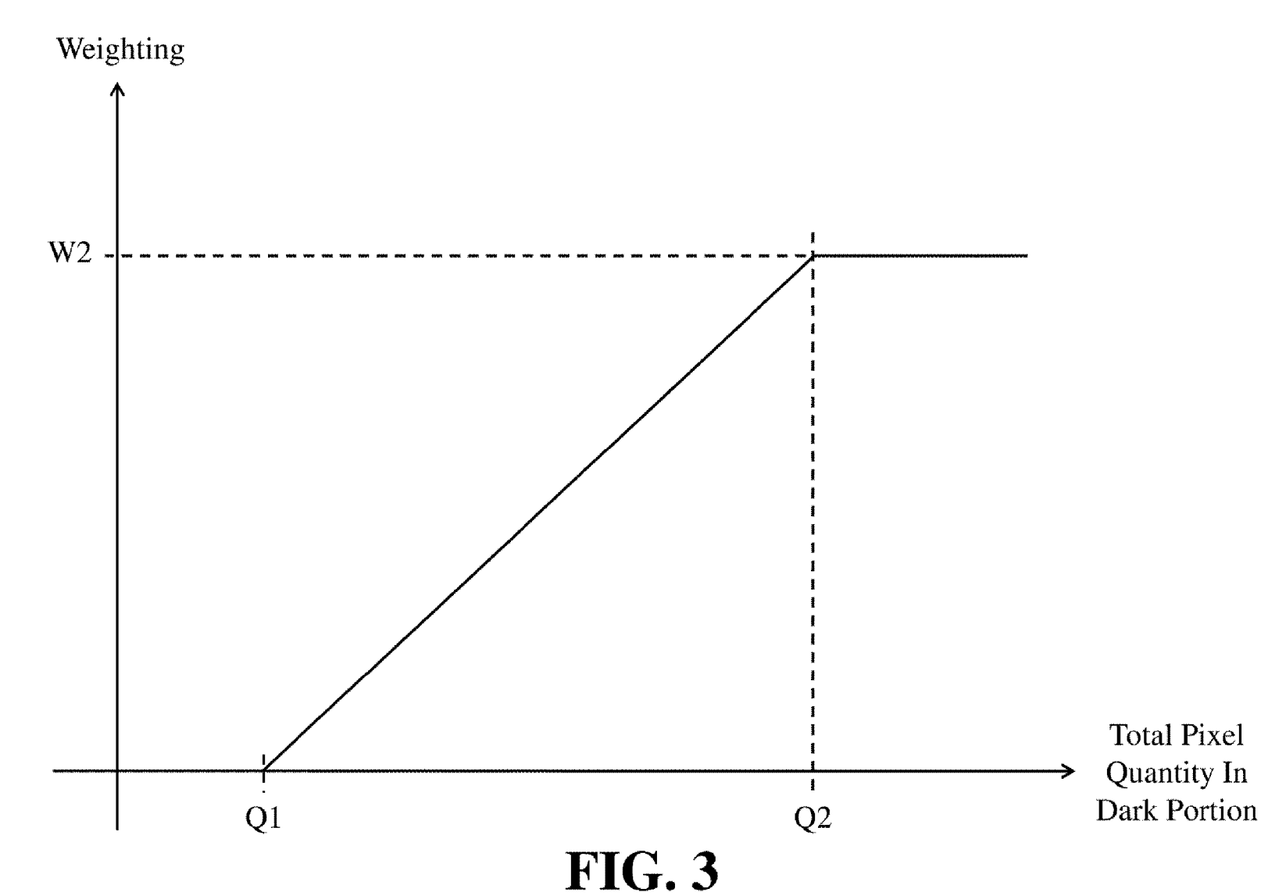
FIG. 3 shows a simplified schematic diagram of adjust the weighting of the initial gain value of the WDR operation according to the total pixel quantity of the dark portion according to one embodiment of the present disclosure.

Please refer to FIG. 3, which shows a simplified schematic diagram of adjust the weighting of the initial gain value of the WDR operation according to the total pixel quantity of the dark portion according to one embodiment of the present disclosure.

As shown in FIG. 3, if the total pixel quantity of the dark portion of the video image is between a first predetermined quantity Q1 and a second predetermined quantity Q2, then the image processing system may configure the weighting of the initial gain value to be directly proportional to the total pixel quantity of the dark portion, such as a linearly directly proportional relationship shown in FIG. 3. If the total pixel quantity of the dark portion exceeds the second predetermined quantity Q2, then the image processing system may configure the weighting of the initial gain value to be fixed at a second predetermined weighting W2.

In the embodiment of FIG. 1, the image processing system may utilize the resulting initial gain value after weighting adjustment to be the target gain value, and conduct the WDR operation on the video image based on the target gain value.

It can be appreciated from the foregoing descriptions that when the method of FIG. 1 is adopted by the image processing system, the image processing system is enabled to obtain the target gain value of the WDR operation based on merely the data of only one video image, without conducting computations on the data of other video images. Therefore, the required computations of the image processing system can be significantly reduced.

In addition, since the image processing system is enabled to compensate the high contrast image by conducting digital computations, the circuit structure of the image sensor can be simplified to reduce the overall circuitry complexity.

Furthermore, in addition to the difference between the average bright portion luminance and the average dark portion luminance, the method of FIG. 1 also adjusts the gain value of the WDR operation according to the color temperature or the exposure duration configuration value. As a result, the accuracy of the WDR operation can be increased and thus the visibility and clarity of the resulting video image can be further improved.

Figure 4:
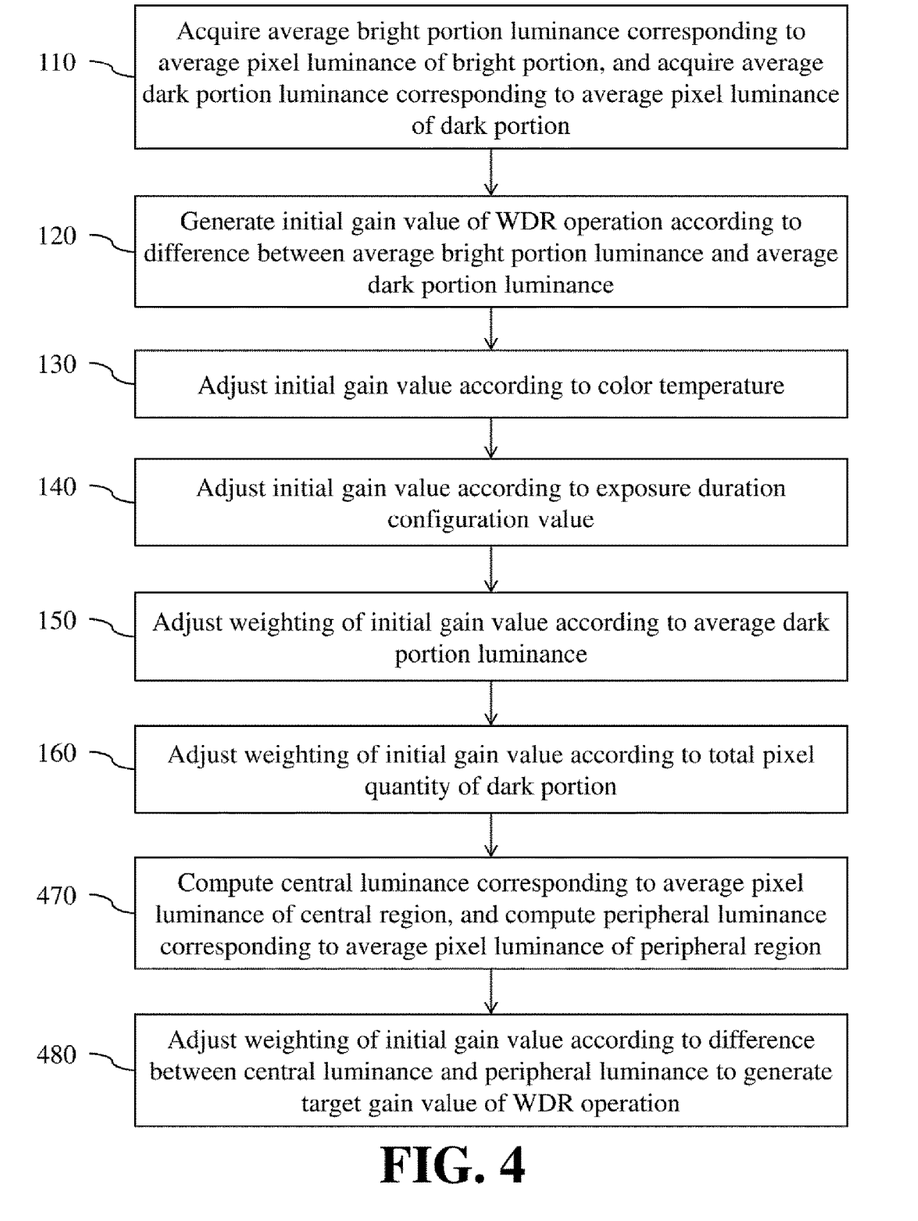
FIG. 4 shows a simplified flowchart of a method for generating a target gain value of the WDR operation according to a second embodiment of the present disclosure.

FIG. 4 shows a simplified flowchart of a method for generating a target gain value of the WDR operation according to a second embodiment of the present disclosure. The main operations in FIG. 4 are similar to those in FIG. 1, but additional operations 470 and 480 are introduced in the embodiment of FIG. 4.

As shown in FIG. 4, after adjusting the weighting of the initial gain value based on the total pixel quantity of the dark portion, the image processing system may perform the operation 470 to further compute a central luminance corresponding to the average pixel luminance of a central region of the aforementioned video image, and to compute a peripheral luminance corresponding to the average pixel luminance of a peripheral region of the video image.

Figure 5:
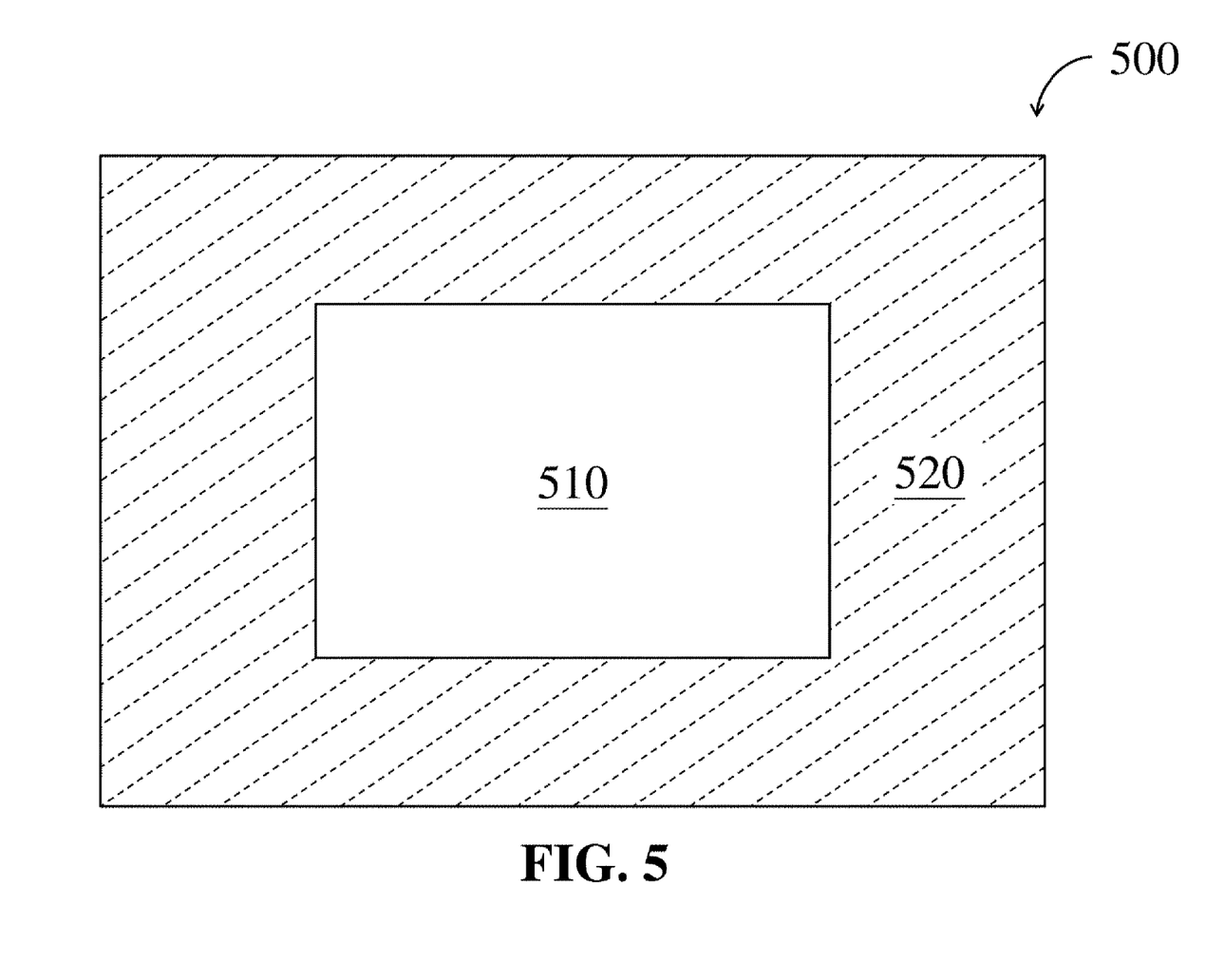
FIGS. 5-6 show simplified schematic diagrams of the video image according to different embodiments of the present disclosure.

For example, FIG. 5 shows a simplified schematic diagram of a video image 500 according to one embodiment of the present disclosure. The video image 500 comprises a rectangular central region 510 and a peripheral region 520 (i.e., the dot-lined region) surrounding the central region 510.

For the embodiment of FIG. 5, the image processing system may compute a central luminance corresponding to the average pixel luminance of the central region 510 and also compute a peripheral luminance corresponding to the average pixel luminance of the peripheral region 520 in the operation 470.

Then, the image processing system may perform the operation 480 to further adjust the weighting of the initial gain value according to the difference between the central luminance and the peripheral luminance to generate the target gain value. Since the human eyes are more sensitive to the central region of an image, the image processing system may configure the weighting of the initial gain value to be directly proportional to the difference between the central luminance and the peripheral luminance to generate the target gain value.

The foregoing descriptions regarding the operations 110-160 of FIG. 1 and related advantages are also applicable to the embodiment of FIG. 4. For the sake of brevity, those descriptions will not be repeated here.

Since the method of FIG. 4 takes the luminance difference between the central region and the peripheral region of the video image into consideration, the accuracy of the WDR operation can be further improved by conducting the WDR operation based on the target gain value generated using the method of FIG. 4. In this way, the visibility and clarity of the resulting video image can be further increased.

Please note that the executing order of the operations in FIG. 1 and FIG. 4 is merely an embodiment, rather than a restriction to the practical implementations. For example, the operations 130 and 140 may be performed simultaneously or may be swapped. In some embodiments, one of the operations 130 and 140 may be omitted. In some embodiments, the operation 160 or both of the operations 150 and 160 may be omitted. Additionally, both of the operations 470 and 480 may be adjusted to be performed before the operation 150. In some embodiments, both of the operations 470 and 480 may be omitted to reduce the required computations of the system.

Figure 6:
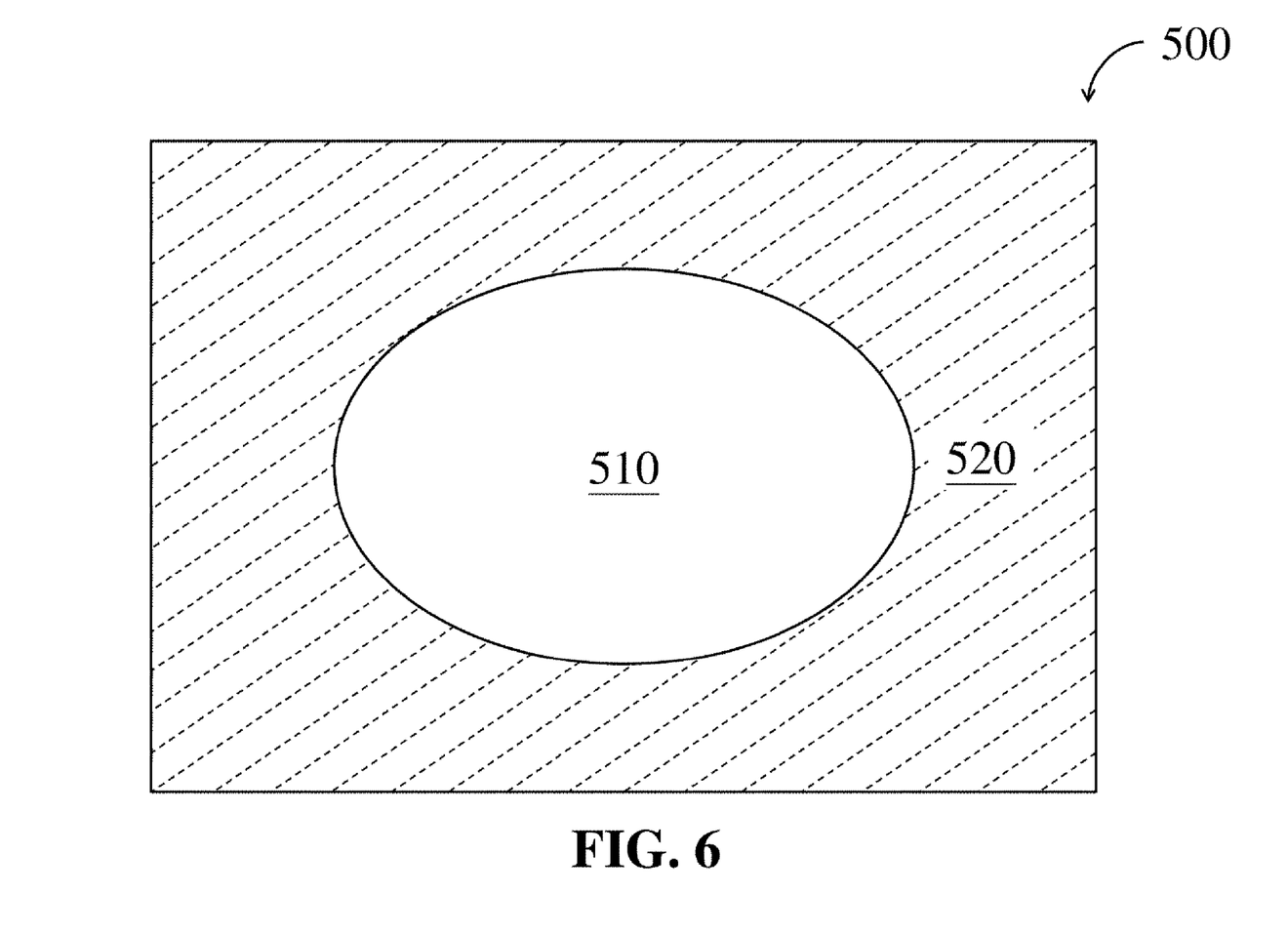

In addition, the shape of the aforementioned central region 510 is merely an embodiment, rather than restriction to the practical implementations. In practice, t the central region of the video image may be configured to have another shape, such as an elliptical shape, a rounded rectangular shape, a hexagonal shape, an octagonal shape, a square shape, and the like. For example, FIG. 6 shows a simplified schematic diagram of the video image 500 according to another embodiment of the present disclosure. In the embodiment of FIG. 6, the central region 510 has an elliptical shape, instead of the rectangular shape shown in FIG. 5.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A method for generating a target gain value of a wide dynamic range (WDR) operation, the method comprising:
   acquiring an average bright portion luminance corresponding to an average pixel luminance of a bright portion of a video image;
   acquiring an average dark portion luminance corresponding to an average pixel luminance of a dark portion of the video image;
   generating an initial gain value of the WDR operation according to a difference between the average bright portion luminance and the average dark portion luminance; and
   adjusting the initial gain value according to at least one of a color temperature and an exposure duration configuration value of the video image to generate the target gain value.

2. The method of claim 1, wherein the operation of generating the initial gain value comprises:
   configuring the initial gain value to be directly proportional to the difference between the average bright portion luminance and the average dark portion luminance.

3. The method of claim 1, wherein the operation of adjusting the initial gain value comprises:
   configuring the initial gain value to be directly proportional to a value of the color temperature.

4. The method of claim 1, wherein the operation of adjusting the initial gain value comprises:
   configuring the initial gain value to be inversely proportional to the exposure duration configuration value.

5. The method of claim 1, wherein the operation of adjusting the initial gain value comprises:
   after adjusting the initial gain value according to at least one of the color temperature and the exposure duration configuration value, further adjusting a weighting of the initial gain value according to the average dark portion luminance to generate the target gain value.

6. The method of claim 5, wherein the operation of adjusting the weighting of the initial gain value comprises:
   if the average dark portion luminance is lower than a threshold luminance (L1), configuring the weighting of the initial gain value to be fixed at a first predetermined weighting (W1); and
   if the average dark portion luminance is greater the threshold luminance (L1), configuring the weighting of the initial gain value to be inversely proportional to the average dark portion luminance.

7. The method of claim 5, wherein the operation of adjusting the initial gain value comprises:
   after adjusting the weighting of the initial gain value according to the average dark portion luminance, further adjusting the weighting of the initial gain value according to a total pixel quantity of the dark portion to generate the target gain value.

8. The method of claim 7, wherein the operation of adjusting the weighting of the initial gain value according to the total pixel quantity of the dark portion comprises:
   if the total pixel quantity of the dark portion is between a first predetermined quantity (Q1) and a second predetermined quantity (Q2), configuring the weighting of the initial gain value to be directly proportional to the total pixel quantity of the dark portion.

9. The method of claim 1, wherein the operation of adjusting the initial gain value comprises:
   computing a central luminance corresponding to an average pixel luminance of a central region (510) of a video image (500);
   computing a peripheral luminance corresponding to an average pixel luminance of a peripheral region (520) of the video image (500); and
   after adjusting the initial gain value according to at least one of the color temperature and the exposure duration configuration value, further adjusting the weighting of the initial gain value according to a difference between the central luminance and the peripheral luminance to generate the target gain value.

10. The method of claim 9, wherein the operation of adjusting the weighting of the initial gain value according to the difference between the central luminance and the peripheral luminance comprises:
   configuring the weighting of the initial gain value to be directly proportional to the difference between the central luminance and the peripheral luminance.

* * * * *